United States Patent [19]
Hawkes

[11] Patent Number: 5,808,883
[45] Date of Patent: Sep. 15, 1998

[54] DC-TO-DC CONVERTER HAVING CHARGE PUMP AND ASSOCIATED METHODS

[75] Inventor: Charles E. Hawkes, Cary, N.C.

[73] Assignee: Harris Corporation, Palm Bay, Fla.

[21] Appl. No.: 800,421

[22] Filed: Feb. 14, 1997

Related U.S. Application Data

[60] Provisional application No. 60/011,709 Feb. 15, 1996.

[51] Int. Cl.$^6$ .................................................. H02M 7/25
[52] U.S. Cl. ............................................................. 363/60
[58] Field of Search ........................ 363/59, 60; 327/536, 327/537; 307/110

[56] References Cited

U.S. PATENT DOCUMENTS

| | | | |
|---|---|---|---|
| 4,994,955 | 2/1991 | Schoofs et al. | 363/95 |
| 5,043,674 | 8/1991 | Bonaccio et al. | 330/257 |
| 5,099,143 | 3/1992 | Arakawa | 307/296.5 |
| 5,167,024 | 11/1992 | Smith et al. | 395/375 |
| 5,338,987 | 8/1994 | Tomasetti et al. | 307/570 |
| 5,394,320 | 2/1995 | Blodgett | 363/60 |
| 5,423,045 | 6/1995 | Kannan et al. | 395/750 |
| 5,452,434 | 9/1995 | MacDonald | 395/550 |
| 5,457,790 | 10/1995 | Iwamura et al. | 395/494 |
| 5,510,749 | 4/1996 | Arimoto | 327/546 |
| 5,612,861 | 3/1997 | Zhong et al. | 363/59 |
| 5,635,776 | 6/1997 | Imi | 307/110 |
| 5,701,096 | 12/1997 | Higashiho | 327/536 |

*Primary Examiner*—Adolf Berhane
*Attorney, Agent, or Firm*—Allen, Dyer, Doppelt, Milbrath & Gilchrist, P.A.

[57] ABSTRACT

A DC-to-DC converter includes a charge pump, connected to a switch drive and to an input voltage, for selectively boosting the supply voltage to the switch drive; and a charge pump controller cooperating with the charge pump for controlling the supply voltage to the switch drive. The charge pump preferably includes a plurality of transistors connected in series with the supply voltage, and at least one capacitor connected to the transistors. The charge pump controller passes through the input voltage to the supply voltage based upon the input voltage being above a first voltage; boosts the supply voltage to a substantially constant value based upon the input voltage being less than the first voltage and greater than or equal to a second voltage wherein the second voltage is less than the first voltage; and boosts the supply voltage by a multiple of the input voltage based upon the input voltage being less than the second voltage. Method aspects of the invention are also disclosed.

35 Claims, 4 Drawing Sheets

DC-TO-DC CONVERTER HAVING CHARGE PUMP AND ASSOCIATED METHODS

RELATED APPLICATION

This application is based upon prior filed copending provisional application No. 60/011,709 filed Feb. 15, 1996.

FIELD OF THE INVENTION

The present invention relates to the field of electronic circuits and, more particularly, to a DC-to-DC power converter having enhanced efficiency.

BACKGROUND OF THE INVENTION

DC-to-DC power converters are widely used to supply power to electronic devices, such as in computers, printers, etc. Such DC-to-DC converters are available in a variety of configurations for producing a desired output voltage from a source voltage. For example, a buck or step down converter produces an output voltage that is less than the source voltage. A typical step down converter includes a so-called high-side switch which is pulse width modulated to connect the source voltage to an inductor to thereby power the load.

A clock signal is typically used to trigger the high-side switch. In addition, logic circuitry typically controls turn-off of the high-side switch to thereby maintain the output voltage at a desired level and without exceeding a predetermined peak output current. It is especially important for an integrated circuit step down converter that the conversion efficiency be relatively high, and the peak current not be exceeded or thermal damage may quickly result. High efficiency is also desirable to extend the operating life of a rechargeable battery, for example, as may be commonly used to provide power to a DC-to-DC converter.

Of course, the battery voltage, for example, or other input voltage to a DC-to-DC converter may vary, and, if the input voltage drops too low, an insufficient voltage will be available to drive the switch. To accommodate operation for a low input voltage, continuous boosting of the supply voltage to control the switch will likely result in lower overall efficiency. For example, losses may occur in operating the switch outside a preferred range. In addition, the boosting circuit itself consumes power.

SUMMARY OF THE INVENTION

In view of the foregoing background, it is therefore an object of the present invention to provide a DC-to-DC converter and associated method for more accurately and efficiently providing a supply voltage for control of the switch even when the input voltage from the source varies.

These and other objects, features and advantages of the present invention are provided by a converter including a charge pump for selectively boosting the supply voltage to a switch drive, and charge pump control means cooperating with the charge pump for controlling the supply voltage to the switch drive in an efficient manner. More particularly, the charge pump preferably includes a plurality of transistors connected in series with the supply voltage, and at least one capacitor connected to the transistors. The charge pump control means preferably passes through the input voltage to the supply voltage based upon the input voltage being above a first voltage. The charge pump control means preferably boosts the supply voltage when the input voltage is below the first voltage.

In one embodiment, the charge pump control means preferably boosts the supply voltage to a substantially constant value based upon the input voltage being less than the first voltage and greater than or equal to a second voltage which is less than the first voltage. Accordingly, the desired supply voltage for the switch drive is not exceeded. In this embodiment, the charge pump control means may also boost the supply voltage by a multiple of the input voltage based upon the input voltage being less than the second voltage.

The charge pump draws substantially no power when passing through the input voltage to the supply voltage. The pass through means of the charge pump control means may be provided by a pass diode connected between the input voltage and the supply voltage. Accordingly, the efficiency of operation is enhanced when the charge pump is not needed. In addition, the charge pump can also be controlled to boost the supply voltage when needed, yet maintain the boosted voltage for efficient operation of the switch.

The constant boost means of the charge pump control means may include servo means cooperating with a predetermined transistor, such as the transistor coupled to the negative supply rail, for controlling the charge pump to thereby boost the supply voltage to the constant value. The multiple boost means, which is operative in one embodiment when the input voltage falls further, may boost the supply voltage by a simple doubling of the input voltage.

The charge pump may include four MOS transistors connected in series with the input voltage, and a bucket capacitor connected across a second and third transistor. The charge pump control means may further include transistor turn-off means for turning off the four transistors and thereby tri-stating the bucket capacitor of the charge pump when the charge pump is idle, that is, when the input voltage is sufficiently high so that the converter is operating in the pass through mode. Accordingly, the charge on the capacitor may be available when later needed to allow the charge pump to more rapidly converge to the steady state when started.

The charge pump control means may include transistor shoot-through reducing means for reducing shoot-through in the MOS transistors. In addition, the charge pump control means may further comprise over-voltage means for detecting an over-voltage when the supply voltage exceeds a third voltage higher than the first voltage, and for turning the charge pump off responsive to the over-voltage. The over-voltage means may be especially beneficial when a filter is applied to the input voltage to reduce perturbations to the charge pump control means, as the filtered input voltage signal may lag the true input voltage.

A method aspect of the invention is for operating a DC-to-DC power converter for supplying power to a load from a source. The converter is preferably of a type comprising a switch for supplying power from the source to the load, and switch drive means for controlling the switch and being operable from a supply voltage. The method preferably includes the steps of: providing a charge pump connected to the switch drive means and to an input voltage; passing through the input voltage to the supply voltage based upon the input voltage being above a first voltage; and boosting the supply voltage using the charge pump and based upon the input voltage being less than or equal to the first voltage.

In one embodiment, the step of boosting preferably comprises: boosting the supply voltage to a substantially constant value based upon the input voltage being less than the first voltage and greater than or equal to a second voltage wherein the second voltage is less than the first voltage; and boosting the supply voltage by a multiple of the input voltage based upon the input voltage being less than the second voltage.

DETAILED DESCRIPTION OF THE PREFERRED EMBODIMENTS

Figure 1:
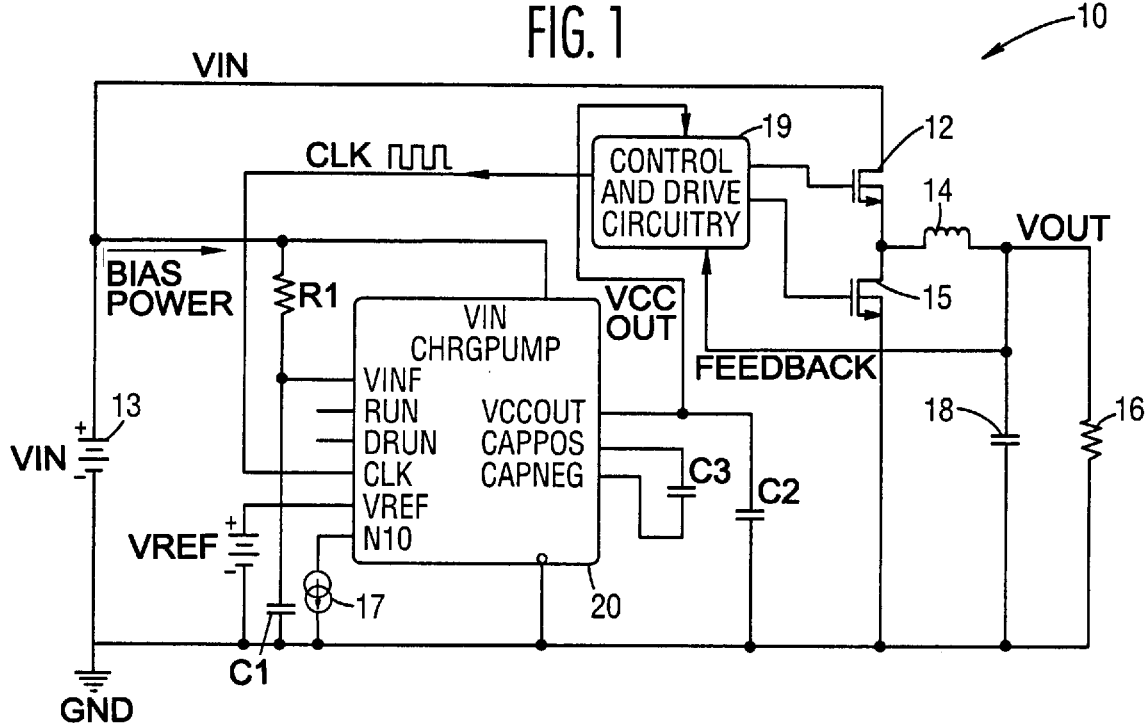
FIG. 1 is a schematic circuit diagram of a DC-to-DC converter in accordance with the present application.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

A DC-to-DC converter 10 in accordance with the present invention is first explained with reference to FIGS. 1–4. An input voltage VIN is applied from a battery 13 through a high-side switch 12 to the inductor 14 to supply current to a load 16. The high-side switch 12 is operated responsive to an upper gate drive signal from the schematically illustrated control and drive circuitry 19, the operation of which will be readily appreciated by those skilled in the art. A capacitor 18 is conventionally applied across the load 16 to smooth the voltage across it as would be readily understood by those skilled in the art.

The lower switch 15 is operated responsive to a lower gate drive signal also from the control and drive circuitry 19. The lower switch 15 may be replaced by a Schottky diode in other embodiments. Those of skill in the art will also readily appreciate the operation of the lower switch 15 without further discussion.

The illustrated converter 10 includes the charge pump circuit block 20 that may be used to provide a supply voltage VCCOUT to the control and drive circuitry 19, and, more particularly, to drive the switches 12 and 15. For ease of understanding the following description will refer only to the switch 12, it further being understood that the term "switch" also covers a plurality of MOS transistors connected in parallel, as are typically used in DC-to-DC converters.

As is known, the input voltage VIN, such as supplied by the illustrated battery 13, for example, may vary considerably, such as from about 4.5 volts to 18 volts. Further, a typical switch 12 may require a minimum operating voltage of about 7 volts, which is more than the 4.5 volt minimum VIN provided by the battery. Accordingly, the charge pump circuit block 20 is provided to ensure that the switch 12 receives at least its minimum required operating voltage.

In the illustrated embodiment, both the input voltage VIN and a filtered version thereof VINF are provided to the charge pump circuit block 20. The filter is provided by the illustrated RC circuit provided by R1 and C1. A reservoir capacitor C2 is illustratively connected across the output voltage or supply voltage VCCOUT of the charge pump circuit block 20. A current reference 17 is also connected to the charge pump circuit block 20.

Figure 4:
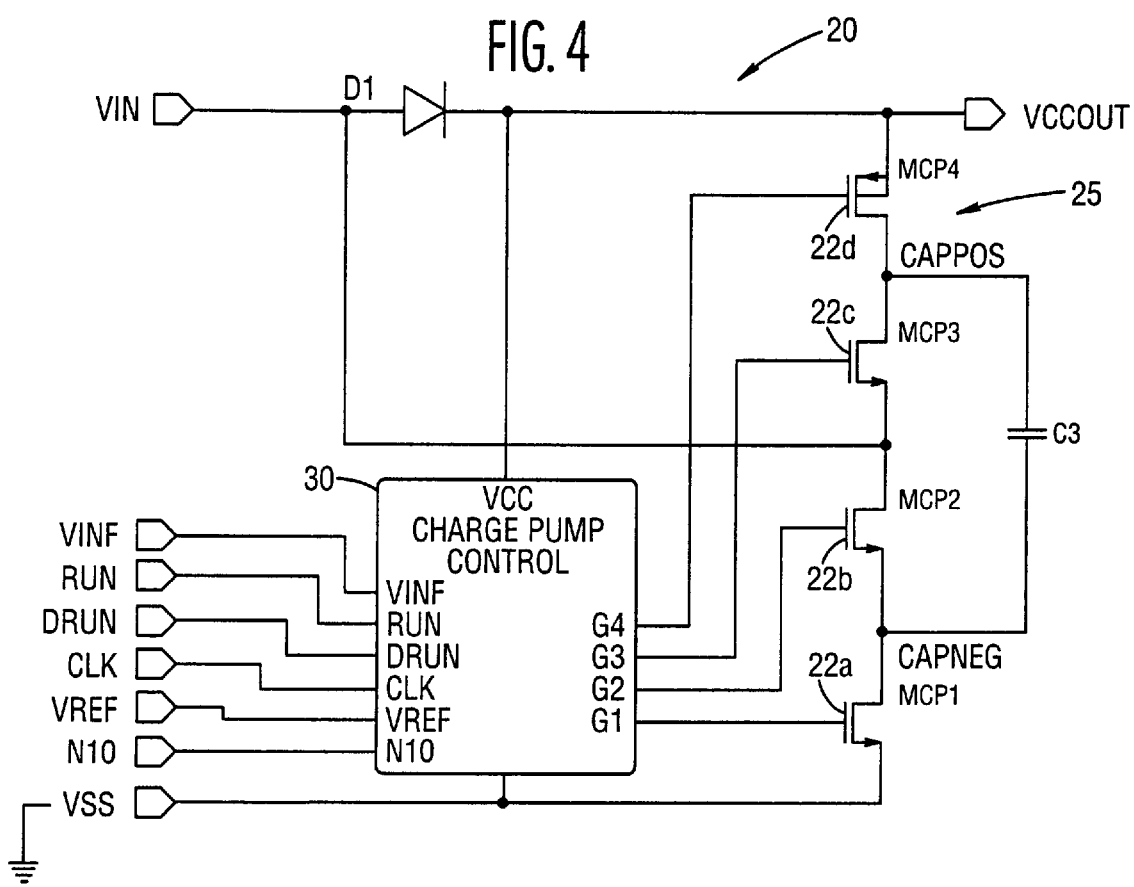
FIG. 4 is a more detailed schematic circuit diagram of a portion of the DC-to-DC converter in accordance with the present invention.

Referring particularly to FIG. 4, the charge pump control circuit block 20 illustratively includes a charge pump 25 for selectively boosting the supply voltage VCCOUT to the control and drive circuit 19 (FIG. 1); and charge pump control means 30 cooperating with the charge pump for controlling the supply voltage in an efficient manner. More particularly, the charge pump 25 illustratively includes a plurality of MOS transistors 22a–d connected in series between the supply voltage and ground. The bucket capacitor C3 is connected to nodes CAPPOS and CAPNEG.

The charge pump control means 30 preferably passes through the input voltage to the supply voltage based upon the input voltage being above a first voltage; and boosts the supply voltage when the input voltage is below the first voltage. In one embodiment, the charge pump control means 30 preferably boosts the supply voltage to a substantially constant value based upon the input voltage being less than the first voltage and greater than or equal to a second voltage which is less than the first voltage. In this embodiment, the charge pump control means 30 may also boost the supply voltage by a multiple, such as two, of the input voltage based upon the input voltage being less than the second voltage.

The charge pump 25 and charge pump control means 30 draws substantially no power when passing through the input voltage to the supply voltage. The pass through means of the charge pump control means 30 may be provided by a pass diode D1 connected between the input voltage and the supply voltage. Accordingly, the efficiency of operation is enhanced when the charge pump 25 is not needed. In addition, the charge pump 25 can also be controlled to boost the supply voltage when needed, yet maintain the boosted voltage for effective and efficient operation of the switch 12.

Figure 2:
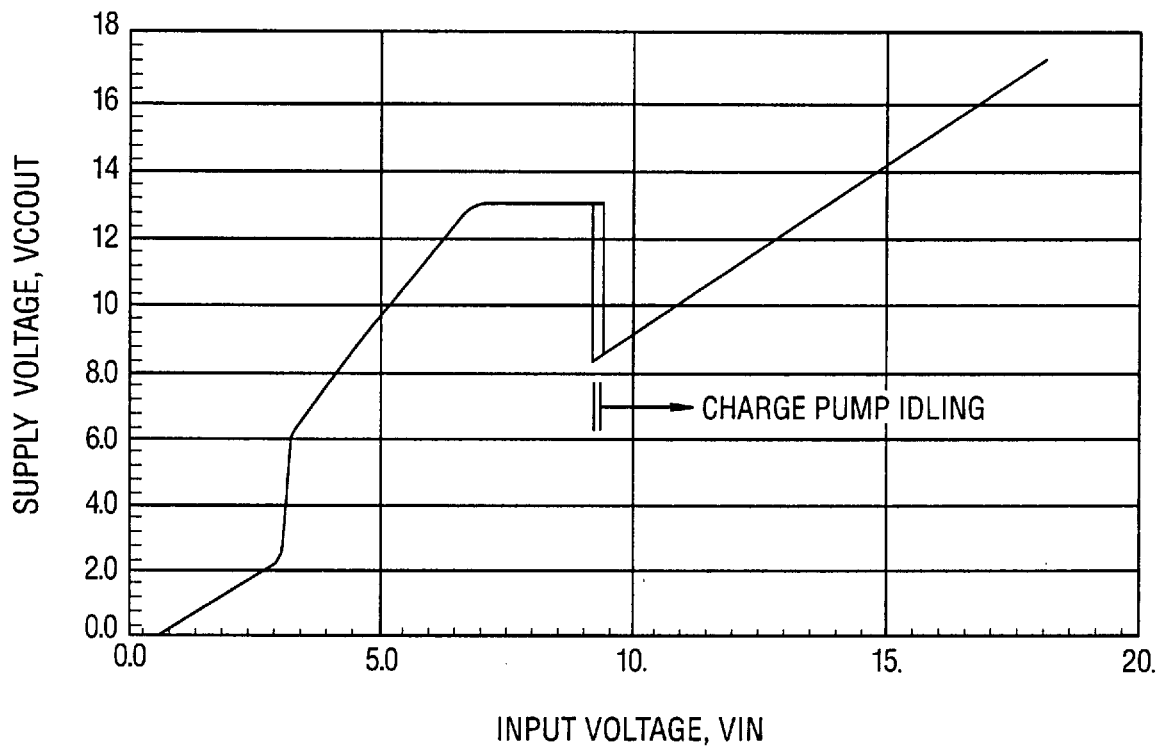
FIG. 2 is a graph illustrating the relationship of input voltage to supply voltage for the DC-to-DC converter in accordance with the present invention.

Turning now more particularly to FIG. 2, the various operating modes or stages of the charge pump 25 as determined by the charge pump control means 30 are further explained. In operation, the charge pump circuit block 20 processes VIN to provide the supply voltage VCCOUT that can be used throughout the converter 10. When VIN is greater than a first voltage (illustratively about 9 volts), the charge pump 25 is idle, and the pass diode D1 provides the input voltage to the supply voltage minus a diode voltage drop. When the charge pump 25 is idling, the charge pump control means 30 still senses the input voltage although the charge pump is not operating so that the overall charge pump circuit block 20 draws essentially no current. Operating frequency may be set by selecting appropriate components, and a preferred embodiment operates up to 1 MHz as would be readily understood by those skilled in the art.

When the input voltage is below the first voltage, about 9 volts as illustrated, and above a second voltage, about 7 volts as illustrated, the charge pump 25 is turned on by the charge pump control means 30 to boost the supply voltage to a relatively constant voltage of about 12.5 volts. A slight amount of hysteresis is illustrated at the transition defined by the first voltage as would be readily understood by those skilled in the art.

The supply voltage is provided by a doubling of the input voltage in the range of less than about 7 volts and down to the lower illustrated limit of about 3 volts. Considered in somewhat different terms the charge pump 25 is operated to boost the supply voltage to the lesser of a constant voltage or a multiple, such as double, of the input voltage.

Figure 3:
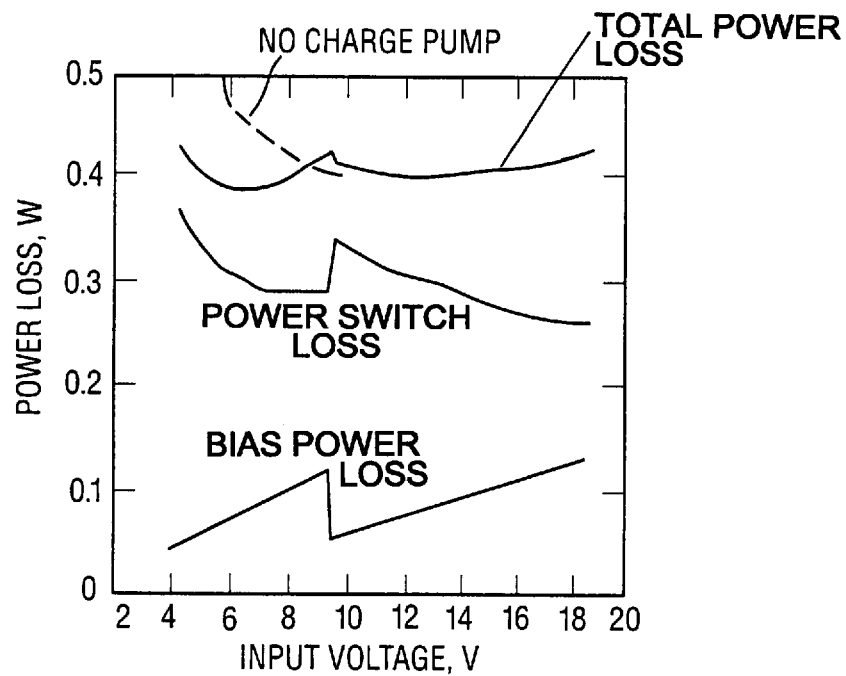
FIG. 3 is a graph illustrating power loss and the components thereof versus input voltage for the DC-to-DC converter in accordance with the invention.

Turning now more particularly to FIG. 3, the operating efficiency of the DC-to-DC converter 10 is better understood. The present invention has a power loss which is relatively constant with a varying input voltage. The bias power loss associated with charge pump 25 operation is illustrated in the lower portion of the graph, the power switch loss in the middle portion, and the total power loss at the top. In addition, the power loss with no charge pump is also shown for comparison by the dashed plot. As can be readily seen, the present invention enjoys lower losses when operating at lower input voltages compared to a circuit without a charge pump.

Figure 5:
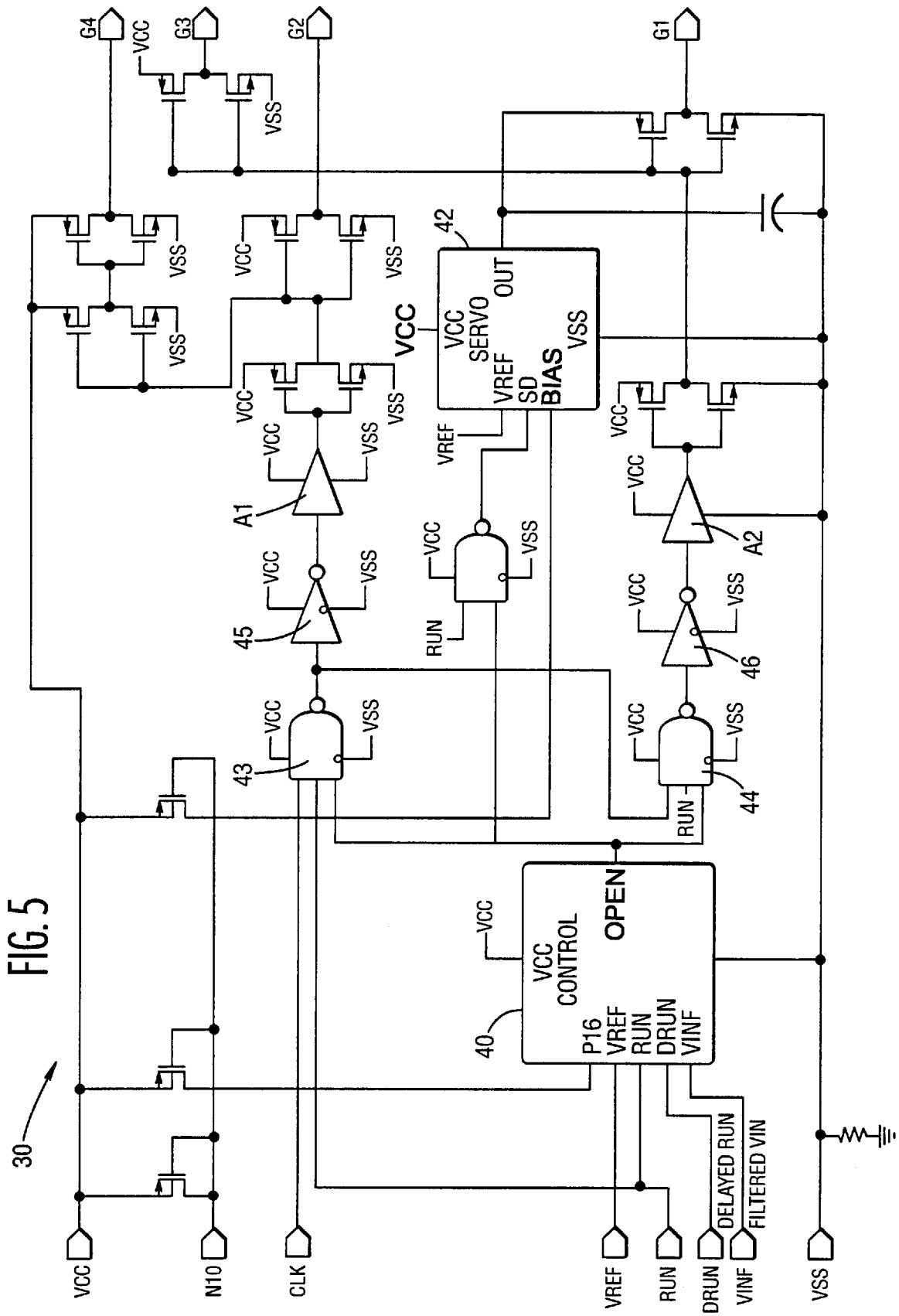
FIG. 5 is a more detailed schematic circuit diagram of another portion of the DC-to-DC converter in accordance with the present invention.

A particular embodiment of charge pump control means 30 may be seen in FIG. 5. The charge pump control means 30 may include control logic 40 to determine whether the input voltage is sufficient to idle the charge pump 25 and for providing a charge pump enable signal from CPEN (e.g., a low signal to idle the charge pump), and a servo circuit 42 for providing a gating signal G1 in a manner which smoothly regulates the supply voltage. When the charge pump is not idling, operating efficiency of the charge pump may be improved by inserting rising edge delays which prevent shoot-through in the MOS transistors 22a–d, and amplifiers A1 and A2 along with the upstream NAND gates 43, 44 and inverters 45, 46 may be provided for this purpose. The charge pump control means 30 may include the other illustrated transistors for generating the gate signals G1–G4, as would be readily understood by those skilled in the art without requiring further discussion.

Figure 6:
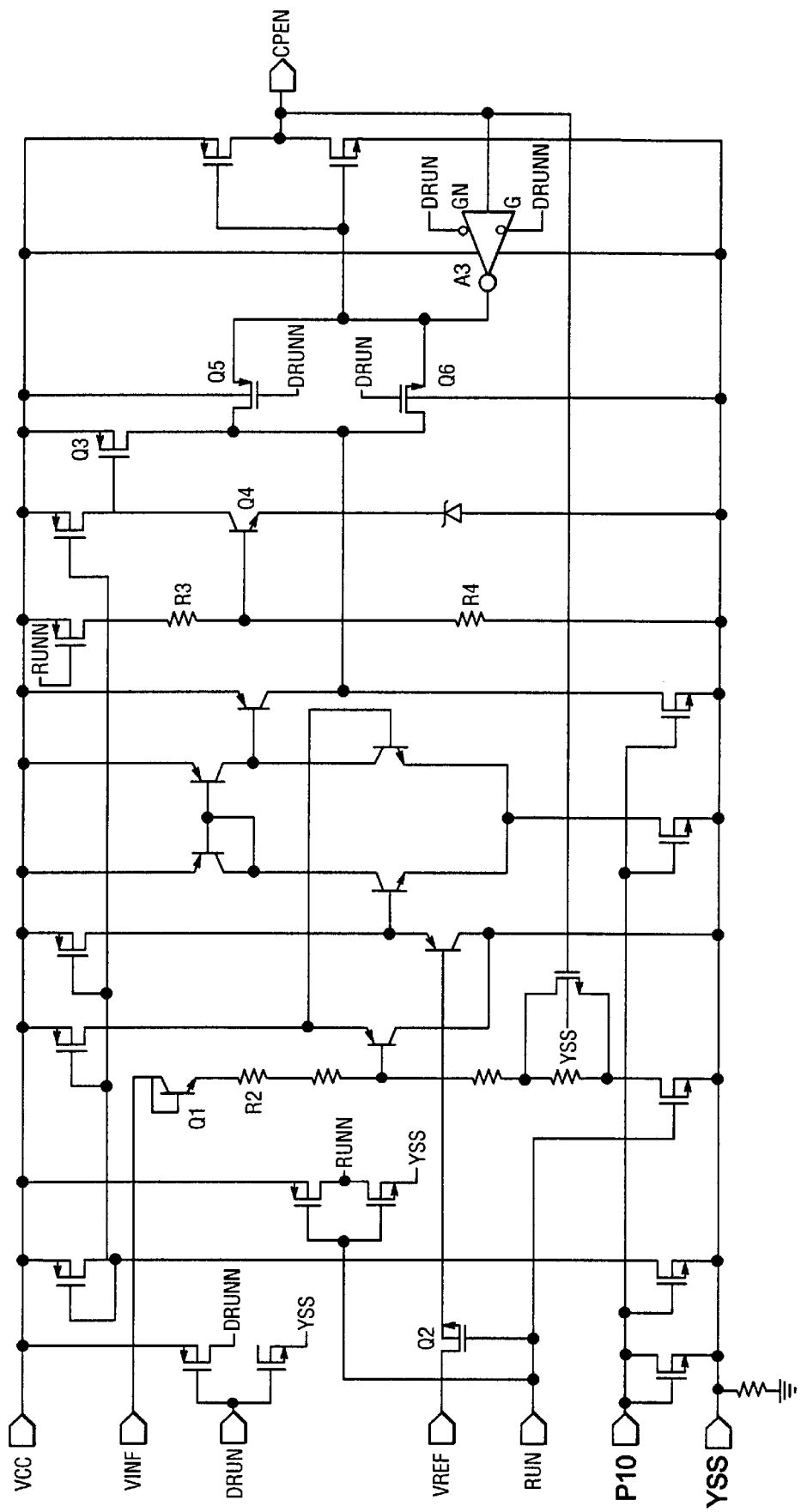
FIG. 6 is a more detailed schematic circuit diagram of yet another portion of the DC-to-DC converter in accordance with the present invention.

A particular embodiment of the control logic 40 may be seen in FIG. 6. VINF is sensed by a high resistance divider network to prevent perturbations on VINF and to reduce the DC drop at VINF, and to this end the divider network may include high resistance resistor R2 (e.g., with resistance of 1 MOHM). Transistor Q1 may be included in series with VINF and the divider network so that the voltage sensed by the network will better reflect the voltage on VCCOUT when the charge pump 25 is idling. Transistor Q2 may be provided to prevent current from flowing back into the source of reference voltage VREF when the charge pump 25 is idling.

As will be appreciated, the response of VINF may lag VIN, and if VIN increases rapidly there may be an overvoltage at VCCOUT as the charge pump 25 continues to run for a short period of time even though VIN has exceeded the first voltage at which the charge pump should be idling. To this end, an over-voltage protection circuit may be included in control logic 40. The over-voltage protection circuit may include R3 and R4, Q3 and Q4, and diode D2, which operate to drive CPEN low (idle the charge pump 25) when VCCOUT exceeds a third voltage, such as 15 volts, for example.

The RUN signal which is also used to selectively energize the charge pump 25 when the input voltage drops below the first voltage may initially induce an erroneous output if VREF has not had time to settle or if VINF is divided down. To this end, a delayed RUN signal, DRUN, may also be provided which has a leading edge which lags RUN by a set amount, for example one-half clock cycle. When DRUN is low, a latch network comprising Q5 and Q6 and amplifier A3 latches CPEN in its prior state while RUN is low. When RUN goes high and control logic 40 is energized, the latch network holds CPEN in its prior state until DRUN goes high. This allows time for a potentially erroneous signal to be avoided.

Returning again to further describe the servo circuit 42 (FIG. 5), when the charge pump 25 is not idling, the servo unit provides a gating signal to the gate of transistor 22a which is the MOS transistor connected closest to ground among the series-connected MOS transistors. The gating signal maintains the supply voltage (12.5 volts in FIG. 2) by gm-limiting the transistor 22a and depositing only the charge needed into bucket capacitor C3. The servo unit 42 may be considered a unity-gain operational amplifier with a DC transfer function of: Vout=15−Vcc. When VCCOUT is less than about 9 volts, the output from the servo unit 42 is held at the VCCOUT voltage, thereby ensuring that the maximum possible voltage will be delivered to the gate of transistor 22a for low VIN voltages which may be of particular importance when VIN<5 volts.

The operation of the charge pump control means 30 is set so that if either RUN or CPEN goes low, all the MOS transistors 22a–d are turned off, effectively tri-stating bucket capacitor C3. Thus, if VIN is high enough so that the charge pump 25 should be idling, MOS transistor 22d will be kept off so that the body diode of transistor 22c does not conduct the current which is supposed to pass through the pass diode D1. Further, the voltage on the bucket capacitor C3 is preserved when the charge pump 25 is idling so that the charge pump can converge on steady state more rapidly if needed following an idle-to-run transition.

Many modifications and other embodiments of the invention will come to the mind of one skilled in the art having the benefit of the teachings presented in the foregoing descriptions and the associated drawings. For example, the DC-to-DC converter may be implemented in integrated circuit form, discrete circuit form, or a combination as would be readily understood by those skilled in the art. Therefore, it is to be understood that the invention is not to be limited to the specific embodiments disclosed, and that modifications and embodiments are intended to be included within the scope of the appended claims.

That which is claimed is:

1. A DC-to-DC power converter for supplying power to a load from a source, the converter comprising:

a switch for supplying power from the source to the load;

switch drive means for controlling said switch and being operable from a supply voltage;

a charge pump, connected to said switch drive means and to an input voltage, for selectively boosting the supply voltage to said switch drive means; and charge pump control means cooperating with said charge pump for controlling the supply voltage to said switch drive means, said charge pump control means comprising pass through means for passing through the input voltage to the supply voltage based upon the input voltage being above a first voltage, constant boost means for boosting the supply voltage to a substantially constant value based upon the input voltage being less than the first voltage and greater than or equal to a second voltage wherein the second voltage is less than the first voltage, and multiple boost means for boosting the supply voltage by a multiple of the input voltage based upon the input voltage being less than the second voltage.

2. A converter according to claim 1 wherein said charge pump draws substantially no power when passing through the input voltage to the supply voltage.

3. A converter according to claim 1 wherein said pass through means comprises a pass diode connected between the input voltage and the supply voltage.

4. A converter according to claim 1 wherein said charge pump comprises a plurality of transistors connected in series with the supply voltage, and at least one capacitor connected to said transistors.

5. A converter according to claim 4 and wherein said constant boost means comprises servo means cooperating with a predetermined transistor for controlling said charge pump for boosting the supply voltage to the substantially constant value.

6. A converter according to claim 1 wherein said multiple boost means comprises doubling means for controlling said charge pump for boosting the supply voltage to twice the input voltage.

7. A converter according to claim 1 further comprising a filter connected between the input voltage and said charge pump control means.

8. A converter according to claim 1 wherein said charge pump comprises:
   a first, second, third and fourth transistor; and
   a bucket capacitor connected across the second and third transistors.

9. A converter according to claim 8 wherein said charge pump control means further comprises transistor turn-off means for turning off the first through fourth transistors and tri-stating the bucket capacitor when passing through the input voltage to the supply voltage.

10. A converter according to claim 8 further comprising a reservoir capacitor connected across the combination of the first through fourth transistors.

11. A converter according to claim 1 wherein said charge pump comprises a plurality of MOS transistors; and wherein said charge pump control means further comprises transistor shoot-through reducing means for reducing shoot-through in said plurality of MOS transistors.

12. A converter according to claim 1 wherein said charge pump control means further comprises over-voltage means for detecting an over-voltage when the supply voltage exceeds a third voltage higher than the first voltage, and for turning the charge pump off responsive to the over-voltage.

13. A converter according to claim 1 wherein said switch comprises at least one MOS transistor.

14. A DC-to-DC power converter for supplying power to a load from a source, the converter comprising:
   a switch for supplying power from the source to the load;
   switch drive means for controlling said switch and being operable from a supply voltage;
   a charge pump, connected to said switch drive means and to an input voltage, for selectively boosting the supply voltage to said switch drive means; and
   charge pump control means cooperating with said charge pump for controlling the supply voltage to said switch drive means, said charge pump control means comprising
      pass through means for passing through the input voltage to the supply voltage based upon the input voltage being above a first voltage, and
      boost means for boosting the supply voltage based upon the input voltage being less than or equal to the first voltage.

15. A converter according to claim 14 wherein said charge pump draws substantially no power when passing through the input voltage to the supply voltage.

16. A converter according to claim 14 wherein said boost means comprises constant boost means for boosting the supply voltage to a substantially constant value based upon the input voltage being less than the first voltage and greater than or equal to a second voltage wherein the second voltage is less than the first voltage.

17. A converter according to claim 16 wherein said charge pump comprises a plurality of transistors connected in series with the supply voltage, and at least one capacitor connected to said transistors; and wherein said constant boost means comprises servo means cooperating with a predetermined transistor for controlling said charge pump for boosting the supply voltage to the substantially constant value.

18. A converter according to claim 14 wherein said boost means comprises multiple boost means for boosting the supply voltage by a multiple of the input voltage based upon the input voltage being less than the first voltage.

19. A converter according to claim 18 wherein said multiple boost means comprises doubling means for controlling said charge pump for boosting the supply voltage to twice the input voltage.

20. A converter according to claim 14 wherein said pass through means comprises a pass diode connected between the input voltage and the supply voltage.

21. A converter according to claim 14 further comprising a filter connected between the input voltage and said charge pump control means.

22. A converter according to claim 14 wherein said charge pump comprises:
   a first, second, third and fourth transistor; and
   a bucket capacitor connected across the second and third transistors.

23. A converter according to claim 22 wherein said charge pump control means further comprises transistor turn-off means for turning off the first through fourth transistors and tri-stating the bucket capacitor when passing through the input voltage to the supply voltage.

24. A converter according to claim 14 wherein said charge pump comprises a plurality of MOS transistors; and wherein said charge pump control means further comprises transistor shoot-through reducing means for reducing shoot-through in said plurality of MOS transistors.

25. A converter according to claim 14 wherein said charge pump control means further comprises over-voltage means for detecting an over-voltage when the supply voltage exceeds a third voltage higher than the first voltage, and for turning the charge pump off responsive to the over-voltage.

26. A DC-to-DC power converter for supplying power to a load from a source, the converter comprising:
   a switch for supplying power from the source to the load;
   switch drive means for controlling said switch and being operable from a supply voltage;
   a charge pump, connected to said switch drive means and to an input voltage, for selectively boosting the supply voltage to said switch drive means, said charge pump comprising a plurality of transistors connected in series to the supply voltage and at least one capacitor connected across predetermined ones of said plurality of transistors; and
   charge pump control means cooperating with said charge pump for controlling the supply voltage to said switch drive means, said charge pump control means comprising
      pass through means for turning off said plurality of transistors to draw substantially no power and for passing through the input voltage to the supply voltage based upon the input voltage being above a first voltage, and boost means for boosting the supply voltage based upon the input voltage being less than or equal to the first voltage.

27. A converter according to claim 26 wherein said boost means comprises constant boost means for boosting the supply voltage to a substantially constant value based upon the input voltage being less than the first voltage and greater than or equal to a second voltage wherein the second voltage is less than the first voltage.

28. A converter according to claim 26 wherein said boost means comprises multiple boost means for boosting the supply voltage by a multiple of the input voltage based upon the input voltage being less than the first voltage.

29. A converter according to claim 26 wherein said pass through means comprises a pass diode connected between the input voltage and the supply voltage.

30. A method for operating a DC-to-DC power converter for supplying power to a load from a source, the converter comprising a switch for supplying power from the source to the load, and switch drive means for controlling the switch and being operable from a supply voltage, the method comprising the steps of:

providing a charge pump, connected to the switch drive means and to an input voltage;

passing through the input voltage to the supply voltage based upon the input voltage being above a first voltage; and boosting the supply voltage using the charge pump and based upon the input voltage being less than or equal to the first voltage.

31. A method according to claim 30 wherein the step of boosting comprises the steps of:

boosting the supply voltage to a substantially constant value based upon the input voltage being less than the first voltage and greater than or equal to a second voltage wherein the second voltage is less than the first voltage; and boosting the supply voltage to a multiple of the input voltage based upon the input voltage being less than the second voltage.

32. A method according to claim 31 wherein the step of boosting the supply voltage by a multiple of the input voltage comprises boosting the supply voltage to twice the input voltage.

33. A method according to claim 30 wherein the step of providing a charge pump comprises providing a plurality of transistors connected in series to the input voltage and providing a bucket capacitor connected to predetermined ones of the transistors; and further comprising the step of turning off the transistors and tri-stating the bucket capacitor when passing through the input voltage to the supply voltage.

34. A method according to claim 30 wherein the step of providing a charge pump comprises providing a plurality of MOS transistors connected in series to the input voltage; and further comprising the step of reducing shoot-through in the plurality of MOS transistors.

35. A method according to claim 30 further comprising the steps of:

detecting an over-voltage when the supply voltage exceeds a third voltage higher than the first voltage; and turning the charge pump off responsive to the over-voltage.

* * * * *